United States Patent
Cicogna et al.

(10) Patent No.: US 6,265,663 B1
(45) Date of Patent: *Jul. 24, 2001

(54) TERMINAL FOR AN ELECTRIC CABLE

(75) Inventors: Francesco Cicogna; Bruno Parmigiani; Dario Quaggia, all of Milan (IT)

(73) Assignee: Pirelli Cavi S.p.A. (IT)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/950,214

(22) Filed: Oct. 14, 1997

Related U.S. Application Data

(63) Continuation of application No. 08/386,294, filed on Feb. 9, 1995, now abandoned.

(30) Foreign Application Priority Data

Feb. 11, 1994 (IT) ................................. MI94A0239

(51) Int. Cl.[7] ................................. H02G 15/064
(52) U.S. Cl. ............. 174/73.1; 174/74 R; 174/75 R; 174/75 D
(58) Field of Search .................. 174/73.1, 74 R, 174/75 R, 75 D

(56) References Cited

U.S. PATENT DOCUMENTS

| | | | |
|---|---|---|---|
| 1,878,169 | * 9/1932 | Myers | 174/73.1 |
| 3,539,706 | * 11/1970 | Buroni et al. | 174/73.1 X |
| 4,074,926 | * 2/1978 | Broad | 174/73.1 X |
| 4,757,159 | * 7/1988 | Dejean | 174/73.1 |
| 4,791,245 | * 12/1988 | Thornley | 174/74 R |

FOREIGN PATENT DOCUMENTS

| | | | |
|---|---|---|---|
| 1051353 | * 2/1959 | (DE) | 174/73.1 |
| 2448705 | 12/1975 | (DE) | . |
| 2746295 | * 4/1979 | (DE) | 174/73.1 |
| 3300901 | * 7/1984 | (DE) | 174/73.1 |
| 4009243 | * 9/1991 | (DE) | 174/73.1 |
| 7584 | * 2/1980 | (EP) | 174/73.1 |
| 1569386 | 4/1969 | (FR) | . |
| 893376 | 4/1962 | (GB) | . |
| 146916 | * 6/1990 | (JP) | 174/73.1 |
| 9116564 | 10/1991 | (WO) | . |

OTHER PUBLICATIONS

"Termi–Matic", General Electric, pp 1–8, (CI 174/73.1), Oct. 1969.*

IEEE Conference Record 1974 Underground Transmission and Distribution Conference, Apr. 1, 1974, pp. 224–231 Mitsugu Saito et al.

* cited by examiner

Primary Examiner—Albert W. Paladini
(74) Attorney, Agent, or Firm—Norris, McLaughlin & Marcus; L. P. Brooks

(57) ABSTRACT

In a terminal for a high-voltage electric cable the electric cable is terminated at a predetermined height from its entry into the terminal and the electric connection between the cable conductor the overhead line is obtained by a rigid conductor element. The rigid conductor element, preferably a copper pipe, is provided with an elastomeric ribbed coating and is supported by an insulating base preferably made of an epoxy resin. An assembly constructed from an epoxy resin base and a rigid conductor element brings the electric field at the surface to a value consistent with the dielectric strength of the air and is long enough to form an insulation path suited for the installation environment.

12 Claims, 2 Drawing Sheets

TERMINAL FOR AN ELECTRIC CABLE

This application is a continuation of application Ser. No. 08/386,294, filed Feb. 9, 1995 now abandoned.

The present invention relates to a terminal for an electric cable, in particular to a terminal for a medium and high-voltage electric cable for external use, that is adapted to be used outdoors, being exposed to the air and possible polluting agents.

To the ends of the present invention by the-term "medium and high voltage" it is generally meant that voltages in a range of 10 kV to 245 kV or more are taken into account.

Cable terminals for external use are known, for example, for connecting a cable to an overhead line, usually comprising an insulating envelope provided with means for connection to a support pylon inside which the end portion of a cable is housed, said end portion being deprived of its outer protection layer and provided with a field control element, the conductor of said cable extending as far as the end of the insulating envelope, to be connected to the overhead line.

According to an example of the known art, the insulating envelope is made up of a porcelain element which ensures an insulation between the end portion of the live cable conductor and the bearing structure of the terminal, said bearing structure being connected to earth and having a surface extension sufficient to restrain the current passage along the outer surface of the terminal.

It is known that an electric cable of the type provided with an extruded insulator, mainly comprises an inner conductor, consisting for example of a metal cord made of copper or the like, coated with a semi-conductive layer, an insulating layer, an electrically earthed screen, and a protection sheath.

At the terminal inlet the cable is deprived of the sheath and screen, and field control elements are used for restraining the electric field gradients at the interruption of the screen.

By field control elements, known per se, it is meant either a suitably radiated conductive body, usually referred to as an electrode or baffle, normally made of a semiconductive elastomeric material incorporated in a body of an insulating material, the assembly being conveniently shaped in order to keep the electric field gradient within acceptable limits, or a material having a variable dielectric constant and conductivity depending on the electric gradient, or yet a capacitor system.

In an embodiment known from "New Prefabricated Accessories for 64–154 KV Crosslinked Polyethylene Cables" (Underground Transmission and Distribution Conference, 1974, pages 224–232), a terminal for external use is in particular comprised of a base plate, to which the base of a ribbed porcelain body is linked, at the upper end of which the cable conductor is connected, through appropriate support and connection means, an earth electrode and a field control cone, of elastomeric material, is forced into the surface of the cable insulator within a cylinder of epoxy resin, at the point it enters the ribbed body, whereas the free space within the ribbed body is filled with insulating oil.

This insulating oil within the porcelain envelope aims at eliminating the air which is subjected to a possible ionization phenomenon where the electric field has a higher value, which involves impairing of the terminal integrity.

Such a terminal is mounted upright, being linked to a bearing structure at its base.

Also known are terminals for electric cables provided with a solid insulator, for example, from "IEE Power Cables and Accessories 10 kV –180 kV", London, November 1986, pages 238–241, in which the semi-conductive screen of a cable is removed over a certain length thereof starting from the cable end. The screen end is covered with a conductive paint extending over a portion of the cable insulator to which heat-shrinkable field-control pipes having a controlled impedance are applied. Said pipes and the uncovered portion of the cable insulator are therefore covered with a heat-shrinkable pipe of a weather-resistant material, incorporating an insulating profile located at the broken end of the cable screen. Several heat-shrinkable annular ribs are therefore fitted onto the pipe.

Such a terminal, being devoid of rigid elements capable of supporting mechanical stresses in a direction transverse to the conductor axis, is suspended from a frame, via an insulator.

A terminal of the so-called "synthetic" type provided with upper connection means, that is adapted to enable a so-called overhead mounting, is also described in CIGRE' 1992, 21–201, being entitled "Assessment of Service Life", said publication states that a terminal of the "synthetic" type is, among other things, devoid of burst and fire risks in case of inner discharges, as compared to traditional porcelain terminals containing the insulating fluid.

Also known is U.S. Pat. No. 4,757,159 disclosing a terminal comprising a cable portion having an uncovered insulator, on which a multi-layered structure of a high-dielectric-constant insulating material, a semiconductor material having a non-linear coefficient, is disposed.

By high-dielectric-constant insulating material it is meant a material having a dielectric constant relative to the air higher than about 10.

Over the whole length of the uncovered insulator portion and beyond the end of the conductor core of the cable, an armouring extends that comprises several rigid rods of epoxy resin reinforced with unidirectional fiber glass and an external support and protection pipe.

In this solution, in order to inhibit the formation of air pockets, a dry deformable filler material, a putty in particular, is provided to be introduced in order to completely fill all free spaces between the rods, the outer pipe and the high-dielectric-constant layers. The ends of the rods and the pipe are confined by two insulating plates provided with appropriate inlet and outlet openings for enabling passage of the cable in the terminal.

In the '159 patent description it is stated that the reinforcing rods in combination with the insulating plates give the terminal a great stiffness, as well as resistance to compression, drawing and bending moments.

Several cone-shaped discs are disposed around the above armouring and in contact with the outer surface of the pipe. Both the pipe and discs are made of an elastomeric material.

Cable terminals for external use according to the known art therefore either possess a rigid structure in terms of resistance to bending, as in the case of a porcelain element or the assembly disclosed in U.S. Pat. No. 4,757,159 (although in the last-mentioned case the obtainable flexional rigidity is actually limited, as it is ensured by rods substantially independent of one another and of reduced sizes, for bulkiness reasons) inside which the cable end is housed so that the cable conductor projects from the upper end thereof, or they possess a flexible structure elastically fitted on the end portion of the cable.

In the first case, the use of a filler between the cable and the terminal body is necessary. The filler consists of an oil or a particular putty to be applied in the field and is subjected to escape thereby impairing the terminal integrity. In the second case, the lack of flexional rigidity of the terminal requires mounting in a overhead configuration and therefore a more complicated bearing structure is required, as well as interposition of an insulator.

Terminals for indoor use are also known, that is terminals adapted for use in a closed environment, the outer surface of which is designed to operate in contact with a gas or dielectric oil, as shown for example in "Power Cables and Accessories 10 kV–500 kV", Nov. 23–25, 1993, page 275. In such terminals no insulating fluid between the insulator and field control element is provided, and latter element advantageously consists of an elastomeric sleeve.

Such terminals are particularly advantageous for indoor application but are not adapted for external use, in that, in the presence of air and possible polluting agents deposited on their surface, they are unable to offer a sufficient insulation between the uncovered live end and the area connected to earth, due to the reduced length possessed by them.

In fact, the insulator length cannot be freely selected as it is correlated with that of the field-control sleeve. Actually, since said sleeve must exert a radial pressure on the cable and insulator by effect of the axial thrust applied to its end, it is necessary for it to have a reduced length, which length depends on its external diameter. This radial pressure is due, among other things, to the cone-shaped configuration of the inner surface of the insulator and to the friction exerted between said insulator and the sleeve. For surfaces longer than 350 to 400 mm, with a sleeve of a 200–300 external diameter, friction exerted by the contact surfaces of the sleeve, cable and insulator would be unable to ensure a sufficient pressure to the interfaces, in particular during the thermal cycles of the cable, with axial-thrust loads that can be borne without damage by the elastomeric materials used.

A summary of the known solutions for manufacturing terminals both for outdoor and indoor use is also given in CIGRE WG21-06, Oct. 15, 1993 "Types of Accessories for HV Extruded Cables", in particular on pages 18 to 34.

The Applicant has now found that, in order to ensure an efficient self-bearing structure offering an appropriate resistance to bending for cable terminals, in particular of the medium- and high-voltage types, in the absence of fluid or deformable filling materials, it is possible to resort to a solution based on the fact that a rigid conductive element performs the task of, and acts as the self-bearing structure, which conductive element is distinct from the electric cable of which it takes the place as far as connection with the overhead line occurs.

In accordance with the present invention it is therefore provided that the cable be interrupted at the inside of the terminal and that the cable portion until connection to the overhead conductor be replaced with a rigid conductive element, provided with a ribbed rubber coating resting on the bearing structure through an insulating base.

In particular, the invention relates to a terminal for an electric cable having a conductor, an insulation and a screen. The terminal, as viewed along its vertical axis comprises:
- a lower inlet end to access of said electric cable into the terminal and comprising electric means for electrically connecting the cable screen to earth,
- field-control insulating means,
- an uncovered conductive shank at the upper end of the terminal, electrically connected to said cable conductor,
- an outer insulating ribbed covering or shell made of elastomeric material, characterized in that it also comprises:
- a separate conductive element which is mechanically rigid and interposed between said cable conductor and said shank and electrically connected to both,
- a base body of an insulating material, within which said field-control insulating means is housed and carrying electrical and mechanical connecting means at the top for connection to said separate conductive element and cable conductor, said base body being provided with mechanical means for engagement with a bearing structure mounted on the ground,
- an insulating ribbed covering of elastomeric material overlying said separate conductive element,
- in which the electric cable extends within the terminal as far as a predetermined height from the lower inlet end, determining an electric field at the outer surface of the base body which is consistent with the dielectric strength of the air, and said separate conductive element has a lengthwise extension which, together with that of the base body, gives rise to an insulation path capable of ensuring resistance to surface discharges in the foreseen environmental use conditions.

Preferably, said predetermined height of the cable within the terminal provides for an electric field at the outer surface of the base body at not higher than 2.5 kV/mm.

More preferably, said predetermined height corresponds to an electric field at the surface of the base body not higher than 2 kV/mm.

In a preferred embodiment said rigid conductive element comprises a tubular metal element and a connector block integral therewith, having means for mechanical engagement with said base body and means for electrical connection to said cable conductor.

Preferably said tubular metal element is made of copper.

In a preferred embodiment the terminal comprises protection means for protecting the external side surface of the base body, said means being electrically insulating and tracking resistant. Preferably said protection means comprises a coating of elastomeric material integral with or contiguous and adjacent to said insulating ribbed covering.

In the case in which the coating of elastomeric material is contiguous and adjacent to the insulating ribbed coating, preferably an elastic-fit insulating sleeve partly covers said coating of elastomeric material and insulating ribbed coating.

Further features and advantages will be more apparent from the detailed description of a preferred embodiment of a terminal for an electric cable in accordance with the invention, given hereinafter, by way of non-limiting example with reference to the accompanying drawings, in which.

Figure 1:
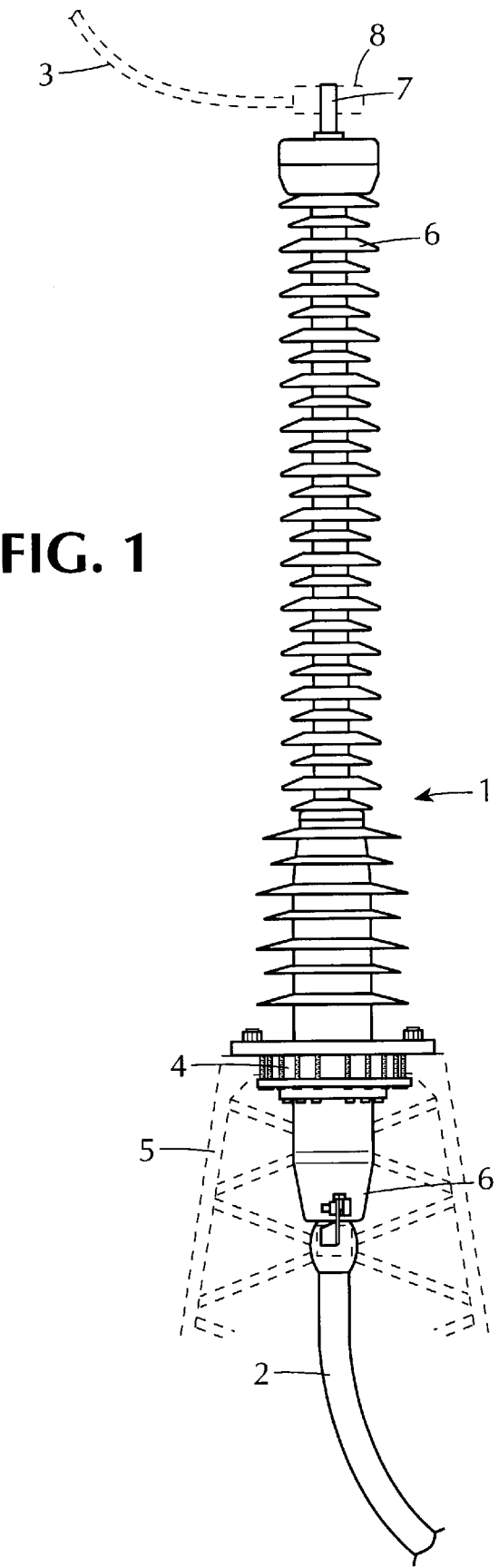
FIG. 1 is an overall view of a terminal according to the invention.

As shown in FIG. 1, a terminal 1 connects an electric high-voltage cable 2 to an overhead conductor 3.

In this example, the cable 2 is of the extruded-insulation type and applies in the field of high voltages, up to 170 kV.

While in the following the terminal of the invention is specifically described in combination with an extruded-insulation cable, it also applies to advantage when stratified-insulator cables impregnated with oil or potting compound are concerned because of the advantages it offers and the important reduction it allows in the insulating oil amount within the terminal, so that burst risks in case of an internal short-circuit are restrained as compared to traditional porcelain terminals.

The terminal, starting from a lower inlet end towards the upper end, comprises a base body 4, provided with a flanged base portion 4a, linked to a supporting structure, such as a pylon 5 by screw means 5a or the like, a metal pipe union 6, in this case of copper, inside which the electric cable entering the terminal passes, a conductor shank 7 projecting from the upper end of the terminal, to which the overhead conductor 3 is connected, through a respective clamp 8 or the like, and a ribbed body 9. The shank 7 is electrically connected to the cable conductor, not described in the following.

The base body 4 and ribbed body 9 have features capable of ensuring insulation between the live shank 7 and pylon 5, which is electrically connected to earth.

Figure 2:
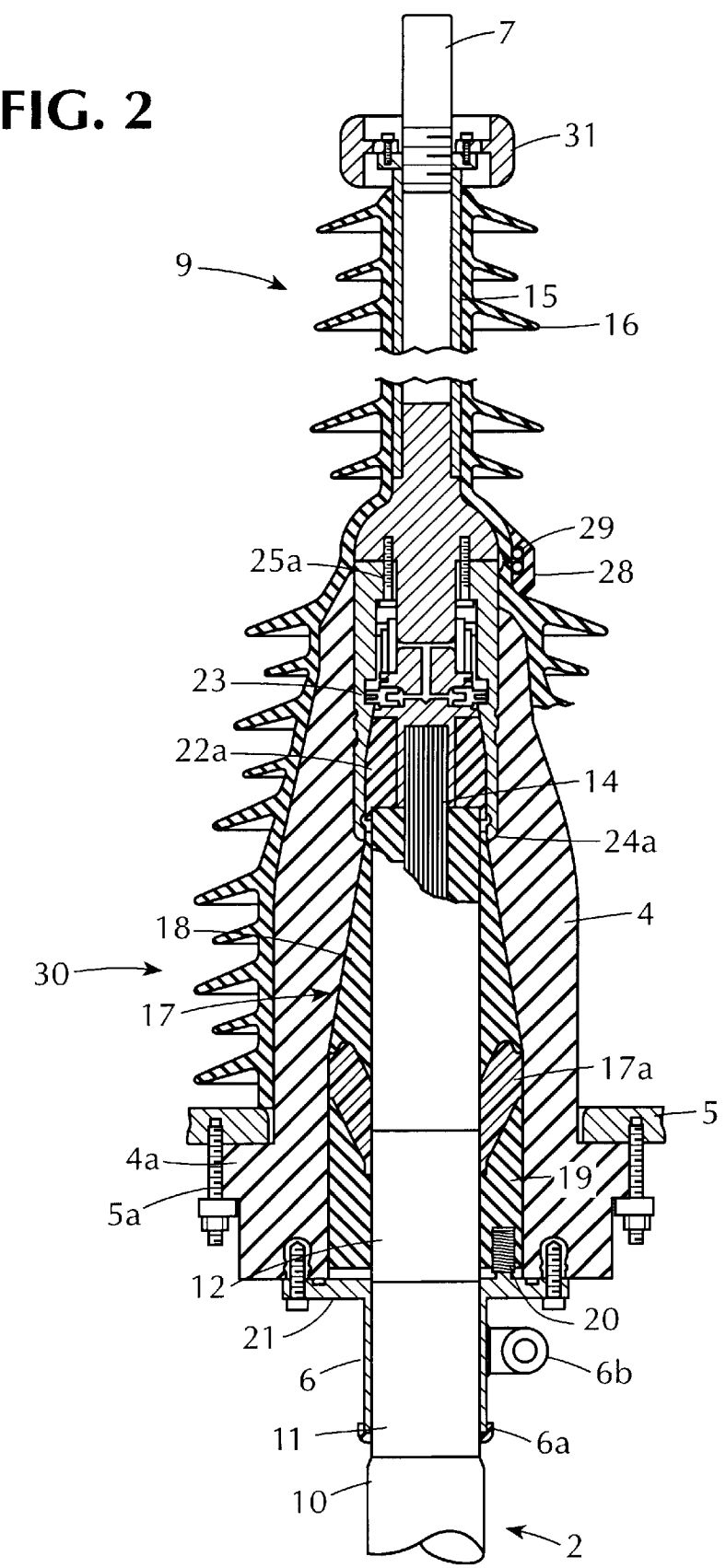
FIG. 2 is a longitudinal sectional view of the terminal shown in FIG. 1.

The cable 2, as shown in FIG. 2, at the terminal is devoid of its external sheath 10 so that its internal sheath 11 is uncovered. The internal sheath 11 may be made of lead if an impervious cable is desired, or made of copper wires or thin plates if the insulator can operate in the presence of humidity. A semiconductive elastomeric layer 12 is present under the inner sheath 11 and also it is uncovered over a portion thereof.

The semiconductive layer 12 forms a cable screen, designed to hold the electric field inside it.

The pipe union 6 connected to the inner sheath 11 through a weldment 6a, ensures imperviousness between the base body 4 and the cable, if required, and carries out grounding or earthing of the cable screen and sheath, through an earth cable, not shown, connected to an eyelet 6b or the like.

An uncovered portion of the insulator 13 extends beyond the point where the semiconductive layer 12 is terminated and an electric conductor 14 projects therefrom, which conductor for example consists of a copper cord.

As shown in the sectional view of FIG. 2, the cable 2 enters the terminal body and is interrupted inside it. The electric connection between the cable conductor 14 and shank 7 is made through a rigid conductive element 15 provided with a closely-fitted rubber covering 16, suitably ribbed and being part of the ribbed body 9.

The rigid conductive element, preferably made of copper, can have several different geometrical shapes, in particular solid or hollow shapes, and preferentially is a tubular element, as shown in FIG. 2.

The material forming the covering 16 is an insulating elastomeric weather-resistant material, capable of not showing the so-called "tracking" phenomenon in the intended use conditions.

By "tracking" it is meant, as defined by IEC standard 109 of 1992, an irreversible decay of the insulating material surface involving formation of conductive paths even under dry conditions.

A material adapted to the purpose may be, for example, an EPR-based blend (elastomer of ethylene-propylene copolymer or ethylene-propylene-diene terpolymer) or a silicone rubber.

At the terminal end of the semiconductive layer 12 of the cable 2, an elastic premoulded sleeve 17 is disposed which comprises a field baffle 17a made of a semiconductive elastomeric material, and an insulating element 18 made of an insulating elastomeric material, for example EPR free from conductive charges, the assembly being kept compressed within the body 4 by a presser element 19, preloaded by springs 20, tightened by a collar 21 linked to the body 4.

The body 4 is made of an insulating material, an epoxy resin for example optionally filled with highly resistant fibres, silicon powder or similar materials adapted to give strength and dimensional stability, and is a hollow body forming a cone-shaped seat matching with the external surface of the insulating element 18 at a contact pressure determined by a preloading applied by springs 20.

At the uncovered end of the cable conductor 14, a lug 22 is connected by plastic deformation, welding or the like, said lug being provided with bayonet means 23 or the like through which it is mechanically linked to an electrically conductive bushing 24 incorporated in the upper end of the base body 4 and fixedly integral therewith.

A mechanically-resistant filling ring 22a is disposed around the lug 22 and is adapted to offer an abutment surface to the terminal end of the cable insulator, in order to avoid the plastic deformation of same under the radial thrust of the sleeve.

The filling ring 22a is electrically screened at the outside by the bushing 24 surrounding it and therefore it can be made either of an insulating plastic material, such as a polyamide resin or the like, or of a conductive metal material, since it must not perform particular electric functions.

The bushing 24, by its lower portion 24a the end of which is suitably radiated, extends as far as the upper end of the insulating element 18 of the sleeve 17, thereby screening its end. A metal connector 25, made of copper for example, is mechanically linked to the upper end of the bushing 24, through screw means 25a or the like, and electrically connected to the lug 22, through respective contact elements 26.

Also mechanically linked and electrically connected to the connector 25 is the rigid conductive element 15 which is electrically and mechanically connected, at the upper part thereof, to the shank 7. The electrical and mechanical connections between the connector 25 and element 15 can for example take place, as shown in the FIG. 2 by screw threading, welding or similar means.

Also an upper screen 31 is conveniently connected to the shank 7, said screen being suitably sized in order to avoid discharges due to the "corona effect" at conductor portions having an important bending.

Preferably, the closely-fitted rubber covering 16 of the ribbed body 9 extends, as shown in the left-hand portion of FIG. 2, as far as it partially or completely covers the base body 4 by its lower portion 27.

The above extension can be made either of one piece construction with the covering 16, that is by moulding the portion 27 together with the covering 16 and forcedly fitting said portion 27 on the base body 4, or separately, making said portion 27 integral with the body 4 and connecting it to the covering 16 by vulcanization.

In a further alternative embodiment, as diagrammatically shown in the right-hand side of FIG. 2, connection between portion 27 and covering 16 can be made by an elastic sleeve 28 fitted by contact so that it overlaps the junction area.

To this end, the sleeve 28 can be made of an elastomeric material, such as EPR or silicone rubber, offering appropriate electric features as regards insulation and "tracking" resistance, and mechanical features, so as to ensure a sufficient contact pressure on the edges of covering 16 and the portion 27.

An electrode 29, of a conductive elastomeric material, is conveniently present in the sleeve 28 at the junction point between the bushing 24 and connector 25 and in electric contact with same, for screening any areas of said elements having an important bending, where local increase in the electric field may occur. Such measures, if necessary, can be provided in the case of a vulcanized connection or unitary coating.

By way of example, a terminal having the above configuration, for voltages up to 170 kV, had a body 4 about 500 mm long and ribbed body 9 about 1500 mm long, providing an escape line between the shank and bearing pylon of about 5800 mm. The terminal, mounted upright and submitted to a horizontal force of 250 kg, applied to the shank 7, has shown a side deflection of about 10 mm. This value falls within the elastic limits of the materials forming the terminal and is therefore in accordance with IEC standard 137 of 1984 (proviso 7, 28).

The detected deflection, in addition, does not greatly affect the safety distance to be complied with for mounting of the terminal which in the example shown is in the order of 1.5 m.

Operation of the above described terminal is as follows.

As is known, an electric cable comprising a conductor, an insulation and a screen disposed coaxially is the seat of an electric field between the live conductor and its screen, connected to earth, confined within the insulation. At the terminal this field must pass from the configuration confined within the cable to an unconfined configuration, typical of an uncovered or bare conductor and such a passage must take place such as to avoid high local field values occurring, since they cause discharges.

In particular, at the the screen interruption, that is at the breaking off of the semiconductive layer, the electric field would take very high values, as a result of the important bending at such a region, which values are unbearable by the material used, in the absence of appropriate measures.

The field baffle 17a aims therefore at enabling the electric field to be distributed in the insulating element 18 and within the body 4 (and possibly the coating of same) so that both at the inside of the different materials and on the outer surface of said body in contact with the air, there is an electric field value which is consistent with the dielectric strength of the materials and air. As an indication, an acceptable value for the electric field in the air is lower than 2.5 kV/mm and preferably lower than 2 kV/mm.

For a good electric behaviour of the sleeve 17 as a whole, taking into account the above purposes, the interface surfaces between the cable insulator 13 and the sleeve 17 and between the sleeve 17 and the body 4 should be free of air and under relative compression, and should remain unchanged in time even in the presence of temperature variations. The features of said sleeves are known in the art, as above said, and are not further described.

Alternatively, in particular for voltages lower than or equal to 60 kV, the sleeve 17 can be made of a material having a resistivity varying with the voltage, said sleeves been well known in the art.

The electric connection between the shank 7 and the cable conductor 14 is made through the rigid conductive element 15, connector 25, contact elements 26 and lug 22.

The assembly consisting of the base body 4, elastic sleeve 17 and elements associated therewith, up to the connector 25, forms an end unit generally identified by 30 in the figures. The unit 30 may have length and diameter sizes capable of achieving an efficient distribution of the electric field up to acceptable values in contact with the air. Such a unit, however, is not long enough to provide a surface path adapted to limit the current flow to earth to commonly acceptable values, in the order of a few mA.

In fact it is necessary that between the live shank and the supporting pylon 5, connected to earth, an insulation path be provided which is sufficient to ensure resistance to surface discharges under the intended environmental use conditions, taking into account the work voltage, saltiness conditions of the air, existing pollution and so on.

The conditions for establishing such an insulation path are stated for example in publication 815 of 1986 by "International Electrotechnical Commission", entitled "Guide for the selection of insulators in respect of polluted conditions".

Terminals having a configuration similar to that of the end unit 30, in fact, are used only in a confined environment, in the presence of dielectric oil or a dielectric gas, having a dielectric strength 5 to 10 times greater than that of the air, as described in "Power Cables and Accessories 10 kV–500 kV", Nov. 23–25, 1993, page 275, previously mentioned. However they do not seem to be used in the air at the use voltages provided for the terminal of the present invention.

According to the invention, therefore, the ribbed body 9 is associated with the base end unit 30 and it extends lengthwise as far as the desired surface path value adapted to the intended environmental use conditions.

In addition, through the ribbed body 9 and in particular the rigid conductive element 15 incorporated thereinto, the electric connection between the shank and cable conductor takes place.

The rigid conductive element 15 can also be structured according to sizes offering the desired mechanical-rigidity features, adapted for use in a self-bearing configuration.

This is facilitated by the fact that the element 15 is an electrically conductive element. Therefore, it can be made of a metal material the sizes of which can be easily selected in order to comply with mechanical requirements, by virtue of the high mechanical features of such materials, such as modulus of elasticity, ultimate tensile stress and the like.

In addition, the tubular structure of the element 15 in the embodiment shown is particularly adapted to obtain a high moment of inertia of the resisting section, so as to limit bending of the terminal in the presence of transverse forces.

The above described terminal assembly therefore is fit for installation in the absence of specific operations to be carried out in the field, such as filling with oil, gas or other filling materials, and does not show deterioration problems in time, such as oil or gas losses, or decay of the filling material, or burst risks, while offering the best mechanical features that make it adapted for use in an upright self-bearing configuration.

In addition, the structure of the invention lends itself to be tested in the factory on a sample cable, so that the possible presence of intrinsic defects can be highlighted. It can then be dismantled for use in the destination site.

According to the invention, it has been chosen to interrupt the cable conductor at the terminal base, relying on a separate and independent element for the electric connection with the lug connected to the overhead line.

According to the above choice, the function of the restraining member for the electric field at the end of the cable conductor (element 30) is separated from the function of the spacing member between the uncovered conductor (shank 7) and bearing pylon 5 adapted to prevent surface discharges. In addition, said spacing member also carries out the electric connection between the cable conductor and uncovered conductor, thereby avoiding the cable conductor from being extended as far as the junction to the uncovered overhead conductor.

What is claimed is:

1. A self-bearing terminal of high resistance to bending for receiving an end of an electric cable having an operating voltage of at least 10 Kv, said cable having a conductor encircled by insulation which is encircled by a screen, a portion of the insulation and of the screen at an end of the cable being removed to provide an exposed portion of the conductor and an exposed portion of the insulation, said terminal having an upper end and an opposite inlet end and having an axis and an axial length between the upper and inlet ends and said terminal comprising:

a conductive shank at said upper end of the terminal for receiving a further conductor;

a tubular base body of insulating material having a bore encircled by a wall for receiving within the bore said exposed portion of the conductor, said exposed portion of the insulation and a portion of the screen, said base body having an axial length less than the axial length of said terminal, having a diameter, having an outer surface, a base body first end and a base body second end, said base body being disposed with its base body first end at said inlet end of said terminal with its bore extending from said inlet end of said terminal toward said upper end of said terminal and with its base body second end spaced from said upper end of said terminal and intermediate said upper end and said inlet end of said terminal;

securing means at said base body first end for mechanically securing said base body to a supporting structure at earth potential;

tubular electric field control means having an outer surface in engagement with the wall of said bore and an inner surface for engagement with the screen and with said portion of the insulation, said control means and said axial length and diameter of the base body being selected to provide an electric field at the outer surface of said base body which is lower than the dielectric strength of air with the cable in the base body bore and at the operating voltage of the cable, but the length of the base body being less than the length of an axially extending path on the exterior surface of the base body sufficient, with the terminal exposed to air, to limit current flow from said second base body end to the securing means when secured to a supporting structure at earth potential to the order of a few milliamperes;

an electrically conductive and rigid interconnecting element connected to said conductive shank and for connection to the exposed portion of said conductor of said electric cable and for electrically interconnecting said conductor of said electric cable with said conductive shank, said interconnecting element having an axial length extending from adjacent said base body second end to said conductive shank and being mechanically secured to the base body; and an insulating covering made of elastomeric material having an axial length extending from said upper end of said terminal toward said inlet end of said terminal and having an outer surface, said insulating covering encircling said interconnecting element and at least a portion of the length of said base body, the length of said interconnecting element and length of the portion of said base body encircled by the covering and hence, the length of the outer surface of said covering, being selected to resist surface discharges between said upper end of said terminal and said inlet end of said terminal in ambient air conditions and when the operating voltage of the cable is applied between said conductive shank and said inlet end of said terminal.

2. The terminal of claim 1, wherein said insulating covering has external ribs integral therewith.

3. The terminal of claim 1, wherein said insulating covering of elastomeric material comprises an inner part and an outer part with ribs, said inner part being contiguous to said outer part.

4. The terminal of claim 1, wherein said insulating covering comprises a first portion nearer said upper end than a second portion and adjoining said second portion and an elastic insulating sleeve partly covering said first portion and said second portion where said first portion adjoins said second portion.

5. The terminal of claim 1, wherein said body and said covering are in engagement with said interconnecting element so that the terminal is free of insulating fluid receiving spaces when said electric cable is connected to said terminal.

6. The terminal of claim 1 wherein said terminal has a side deflection of not more than about 10 mm when secured to a supporting structure and a horizontal force of 250 Kg is applied to the conductive shank.

7. The terminal of claim 1 wherein the electric field at the outer surface of the base body is not higher than 2.5 KV/mm.

8. The terminal of claim 1 wherein the electric field at the outer surface of the base body is not higher than 2 KV/mm.

9. The terminal of claim 1, wherein said interconnecting element comprises a tubular metal element and a connector block integral therewith and in mechanical engagement with said base body and means for electrical connection to said conductor of said cable.

10. The terminal of claim 9, wherein said tubular metal element is made of copper.

11. A method for connecting a conductor of an electric cable to a conductive shank for receiving a further conductor, wherein said cable has insulation encircling the conductor which is encircled by a conductive screen, said method comprising:

exposing a portion of the cable conductor by removing a portion of the insulation and the screen from around said portion of the conductor;

electrically connecting said portion of said conductor to said conductive shank by a length of a mechanically rigid electrically conductive interconnecting means;

covering said interconnecting means, said portion of the insulation of said cable and a portion of said screen with an electrical insulation covering which extends from said shank to said screen and which has an outer surface of a length sufficient to substantially inhibit surface electrical discharges between said shank and said screen, said covering tightly adhering to said interconnecting means, said portion of said insulation and said portion of said screen to avoid fluid receiving spaces between said covering and said interconnecting means, said portion of said insulation and said portion of said screen; and electrically connecting said screen to earth potential at the end of said covering opposite from said shank.

12. The method of claim 11 wherein said covering includes electric field control means around and engaging said portion of said insulation and said portion of said screen for controlling the electric field gradient at said outer surface of said covering.

* * * * *